(12) United States Patent
Ng et al.

(10) Patent No.: US 6,684,960 B1
(45) Date of Patent: Feb. 3, 2004

(54) TURF AERATOR

(76) Inventors: Cheong-Yeow Ng, 216 S. Jamestown Cir., Andover, KS (US) 67002; Yuet-Leng Wong, 6, Lorong PJU 3/23C Sunway Damansara, 47810 Petaling Jaya Selangor (MY)

( * ) Notice: Subject to any disclaimer, the term of this patent is extended or adjusted under 35 U.S.C. 154(b) by 0 days.

(21) Appl. No.: 10/058,690

(22) Filed: Jan. 28, 2002

(51) Int. Cl.$^7$ .............................................. A01B 45/02
(52) U.S. Cl. .......................................... 172/22; 172/42
(58) Field of Search ............................ 172/21, 22, 42, 172/122, 123, 118, 256

(56) References Cited

U.S. PATENT DOCUMENTS

| | | | |
|---|---|---|---|
| 2,244,099 A | * | 6/1941 | Chase .......................... 172/21 |
| 2,591,572 A | * | 4/1952 | Mascaro ........................ 172/22 |
| 2,700,926 A | * | 2/1955 | Goit .............................. 172/22 |
| 2,768,570 A | * | 10/1956 | Strid ............................ 172/19 |
| 2,856,832 A | * | 10/1958 | Galazin ........................ 172/21 |
| 3,171,498 A | * | 3/1965 | Logan .......................... 172/22 |
| 3,264,877 A | * | 8/1966 | Boxrud ..................... 73/864.31 |
| 3,316,979 A | * | 5/1967 | Dedoes ......................... 172/22 |
| 3,534,818 A | | 10/1970 | Mascaro |
| 3,650,332 A | * | 3/1972 | Dedoes ......................... 172/22 |
| 3,867,052 A | * | 2/1975 | Durham ....................... 404/121 |
| 3,881,553 A | * | 5/1975 | Angeski ........................ 172/22 |
| 4,192,387 A | | 3/1980 | Stinson |
| 4,427,076 A | * | 1/1984 | De Aberasturi ............. 172/548 |
| 4,723,607 A | | 2/1988 | Hansen |
| 4,773,486 A | | 9/1988 | Huber et al. |
| D300,223 S | | 3/1989 | Livingstone |
| 4,924,944 A | | 5/1990 | Cozine et al. |
| 5,119,880 A | | 6/1992 | Zehrung, Jr. et al. |
| 5,353,724 A | | 10/1994 | Wheeley, Jr. |
| 5,488,917 A | * | 2/1996 | Santoli et al. ................. 111/91 |
| 5,520,253 A | * | 5/1996 | Kesting ....................... 172/125 |
| 5,586,604 A | * | 12/1996 | Postema ....................... 172/21 |
| 5,662,172 A | * | 9/1997 | Brown ......................... 172/22 |
| 5,673,756 A | | 10/1997 | Classen |
| 5,680,903 A | | 10/1997 | Oliver |
| 5,690,179 A | * | 11/1997 | Dickson ....................... 172/21 |
| 5,823,269 A | | 10/1998 | Leclerc |
| 5,896,931 A | * | 4/1999 | Roberts et al. ................ 172/42 |
| 6,102,129 A | | 8/2000 | Classen |
| 6,179,061 B1 | | 1/2001 | Fiore |
| 6,422,321 B1 | * | 7/2002 | Dillon ......................... 172/21 |

FOREIGN PATENT DOCUMENTS

GB 2331441 * 5/1999

* cited by examiner

*Primary Examiner*—Victor Batson
(74) *Attorney, Agent, or Firm*—Kenneth H. Jack; Davis & Jack, LLC

(57) ABSTRACT

A turf aerator consisting of a cast concrete roller having an axis of rotation, and having an annular surface displaced radially away from the axis of rotation; first and second radial arrays of tubular tines, each tine among the radial arrays having inner and outer ends, and having soil input and soil output ports; and mounting lug and tine receiving channel combinations attaching the radial arrays of tubular tines to opposite ends of the concrete roller so that the outer ends of such tines extend outwardly from the annular surface of the roller, and so that the inner ends of the tines extend inwardly from the annular surface.

5 Claims, 5 Drawing Sheets

TURF AERATOR

FIELD OF THE INVENTION

This invention relates to mechanisms and articles adapted for lawn or turf aeration. More particularly, this invention is related to such mechanisms and articles incorporating tubular tines or coring tines for upward conveyance of columns of soil and thatch through turf surfaces, such tines leaving multiplicities of aerating channels within the turf surface.

BACKGROUND OF THE INVENTION

Turf aerating tines are known to be configured tubularly, having a hollow dirt and thatch conveying bore, a beveled or chamfered thatch cutting distal end, and having a dirt and thatch outlet port extending through a side wall. Such tines are typically composed of durable steel, and typically have an outside diameter between ⅜" and ¾". In use, such tubular tines are repeatedly and successively driven downwardly into and through a turf surface in need of aeration, and withdrawn upwardly from such surface. Upon each downstroke, such tine is driven downwardly through the turf surface, causing a column of undesirably thatched plant material or hard packed soil to enter the hollow bore of the tine. Upon each successive upward upstroke of such tine, soil and thatch encased within the tine is carried upwardly with the tine. Upon a next successive down stroke of the tine, a new column of soil and thatch is driven into the bore of the tine as the tine cuts through the turf, such action driving the overlying column of soil or thatch within the tine's bore upwardly through the bore for emission from the tine's outlet port. The emitted soil and thatch typically lays upon the surface of the lawn. The end result of repeated usage of such tubular tines upon a thatched or hard packed lawn is aeration, the lawn having a multiplicity of two inch to three inch vertically oriented hollow aerating shafts. The multiplicity of aerating shafts beneficially promotes moisture penetration, stimulating root growth and hastening thatch decomposition. Tubular or coring tines, when used in the above described manner, aerate lawns more efficiently than solid tine aerators, requiring less down force upon the tines in order to cut an acceptably large aerating channel through the turf surface.

A known means for repeatedly downwardly driving and upwardly withdrawing tubular tines into and out of a lawn surface is to rotatably mount radial arrays of such tines upon an axle, and to press the arrays of tines downwardly upon a lawn surface while rolling the tine arrays horizontally over the surface. The necessary successive tine downstrokes and upstrokes is provided by their orbital movement about the axle's axis of rotation. Such known assemblies commonly undesirably over-insert the tines where the turf is soft, and under-insert the tines where the turf is hard and compacted. Such assemblies also tend to undesirably gouge and tear turf surfaces.

The instant inventive turf aerator solves or ameliorates the above described undesirable traits of rotary mounted tubular tined aerators by mounting radial arrays of tubular aerating tines upon side walls of lawn rollers, allowing the rollers to simultaneously function as a lawn smoothing and leveling means, as a tine driving means, as a tine insertion depth control means, and as means for minimizing turf gouging and tearing during aeration. The inventive side wall mount of the tubular tines allows the roller element to perform its normal smoothing and leveling function while preventing the roller's annular surface from interfering with upward conveyance of dirt and thatch through the bores of the tubular tines.

BRIEF SUMMARY OF THE INVENTION

A first structural component of the instant inventive turf aerator comprises at least a first roller. Preferably, the roller comprises a substantially solid cylindrical body formed of a molded concretion such as Portland Cement. A drum or cylinder mold is preferably utilized for casting the preferred cylindrical body concrete roller, such mold having a cylindrical shaft such as a dowel or pipe extending axially therethrough. Preferably, the outside diameter of the dowel or pipe is closely fitted to the outside diameter of a lawn working implement axle upon which the roller is to be rotatably mounted. Preferably, such mold further has a smaller diameter pin or shaft, ideally a threaded bolt, extending transversely therethrough, the pin or bolt passing perpendicularly through the axially extending pipe or dowel. Also preferably, a plurality of spirally threaded bolts are supported upon the side walls of the drum mold so that their threaded ends extend laterally outward from the drum mold in parallel alignment with the axis of rotation. Also preferably, the end walls of the drum mold are configured for casting inset semi-circular tine receiving channels within the end walls of the concrete roller. The inside diameters of the semi-circular channels are preferably fitted for nesting receipt of coring or tubular tines. The laterally extending bolts are preferably positioned in relation to the semi-circular channels so that such bolts extend laterally outwardly from the floors of such channels. The exposed ends of such bolts serve as threaded tine mounting lugs, while the embedded heads and shafts of such bolts preferably dually serve as concrete reinforcement bars and mounting lug anchors. Upon filling of such mold with wet concrete and upon drying and setting, the transversely extending pin, the axially extending dowel, and the mold shell are withdrawn in succession, leaving a final cylindrical body having laterally extending lugs for tine mounting, having an axially extending axle receiving channel, and having a transversely extending drive pin receiving channel. The laterally extending threaded lugs in combination with the tine receiving channels effectively comprise a preferred tine mounting means for connecting radial arrays of tubular tines to the side walls of the roller.

Ideally, the threaded bolt used to form the transverse channel has a spirally threaded hexagonal or square nut threadedly mounted upon its inner end so that, upon threaded extraction of such bolt from the newly molded concrete roller, the pin receiving channel includes at its inner end the threaded nut, facilitating secure bolt mounting and alternate disassembly.

A second component of the instant inventive turf aerator comprises at least a first tubular tine, and preferably laterally paired arrays of tubular tines, mounted upon the side walls of the roller. Necessarily, the at least first tubular tine has an outer end and an inner end, the outer end being displaced radially from the axis of rotation of the roller a distance greater than the radial displacement of the annular surface of the roller, and the inner end of such tine being displaced radially a distance less than that of such annular surface. Such arrangement of the tubular tines allows an outer portion of each tine to extend radially outward for turf insertion, allows an inner portion of each tine to extend radially inward for secure tine mounting, and provides for free passage and conveyance of soil and thatch through the bore of each tine without blockage or clogging caused by the roller's annular surface. The above described molded concrete cylindrical body roller advantageously additionally performs a ballast or weighting function, assisting in downwardly driving the tubular tines through turf surfaces.

While the above described molded concrete cylindrical body represents a preferred roller for use as a component of the instant invention, other roller types may be suitably utilized. For example, a metal cylinder comprising rolled sheet metal or a pipe segment may serve as the roller element. Where a metal cylinder substitutes for the preferred concrete cylinder, the metal cylinder may be adapted to include additional ballast or weight by capping the lateral ends of the cylinder, forming a closed drum, and by filling the cylinder with a heavy material such as sand or lead. Alternately, a substantially solid metal cylindrical body having no hollow ballast receiving space may serve as the roller element. Also alternately and suitably, a hollow plastic cylinder or plastic cylindrical body may be utilized as the roller element. Also alternately and suitably, the roller element may comprise a wood cylinder or wood cylindrical body. Also alternately and suitably, a composite laminate cylinder or cylindrical body may be utilized.

While the above described semi-circular channel and threaded mounting lug tine mounting means is preferred, numerous other tine mounting means may be suitably utilized. For example, the tines may be mounted upon roller side walls by threaded bolts extending through the tines and into and through the side wall of the roller to threadedly engage a spirally threaded side wall aperture or an embedded spirally threaded nut. As further examples, spirally threaded screws, nails, slip pin and pressure ring combinations, slip pin and shear pin combinations, interlocking ridge and channel combinations, interlocking pin and sleeve combinations, hook and eye combinations, quick disconnect couplings, adhesives, pressure fitted joints, rivets, blind fasteners, heat fusion welds, homogenous joints, or whole formed joints may be suitably utilized as means for mounting the tubular tines upon the side walls of the roller.

While the above described axially extending axle receiving channel comprises a preferred means for rotatably mounting the roller, other rotating means may be suitably utilized. For example, axle receiving sleeves may be axially mounted within the roller along the roller's axis of rotation. As a further example, axle receiving bearing rings may be similarly axially mounted. Also, end walls of the roller may suitably be configured to include axially extending journals. Also suitably, a fixed axle mount may be bolted or welded to a side wall of the roller.

In a preferred embodiment of the instant invention, a pair of tined rollers, each preferably configured in accordance with the preferred embodiment described above, are mounted upon laterally extending drive axles of a common walk-behind rototiller, whose tilling tines have been removed. Where the inventive tined rollers are utilized in conjunction with such common rototiller, the rollers are particularly advantageously configured to include internal ballast or weight, such as concrete, sand fill, or lead fill. Many walk-behind rototillers are light weight and have no convenient space for mounting and carrying separate weights or ballast. Locating weight or ballast within the roller of the instant inventive turf aerator allows usage upon light weight rototillers. Alternately, a plurality of the instant inventive turf aerators may be rotatably mounted upon a frame adapted for trailering behind a tractor. Where such trailered configuration is utilized, the frame which rotatably supports the rollers may suitably be configured for mounting and carrying of additional ballast or weight, lessening the need for situating ballast or weight within the rollers. Also alternately, the frame upon which the inventive turf aerators are mounted may be configured as an auxiliary implement attachable to the boom arm or lift arms of mobile construction equipment such as tractor backhoes, excavators, and skid steer loaders. Where the inventive turf aerators are rotatably mounted upon such auxiliary implements, acceptable down force may be provided via the lift arms or boom arm without the provision of additional weight or ballast. The above described rototiller, boom arm auxilliary implements, lift arm auxilliary implements and trailering implements comprise suitable means for rotatably supporting the plurality of inventive turf tillers in axial alignment.

Accordingly, it is an object of the present invention to provide a turf aerator which incorporates a roller with a tubular tine for simultaneously performing turf smoothing and leveling, tine depth control, weighted tine driving, and turf gouge and tearing reduction.

It is a further object of the present invention to provide such a turf aerator which positions its tines with respect to its roller to allow free passage of dirt and thatch through the bores of the tines without blockage or interference by the annular surface of the roller.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
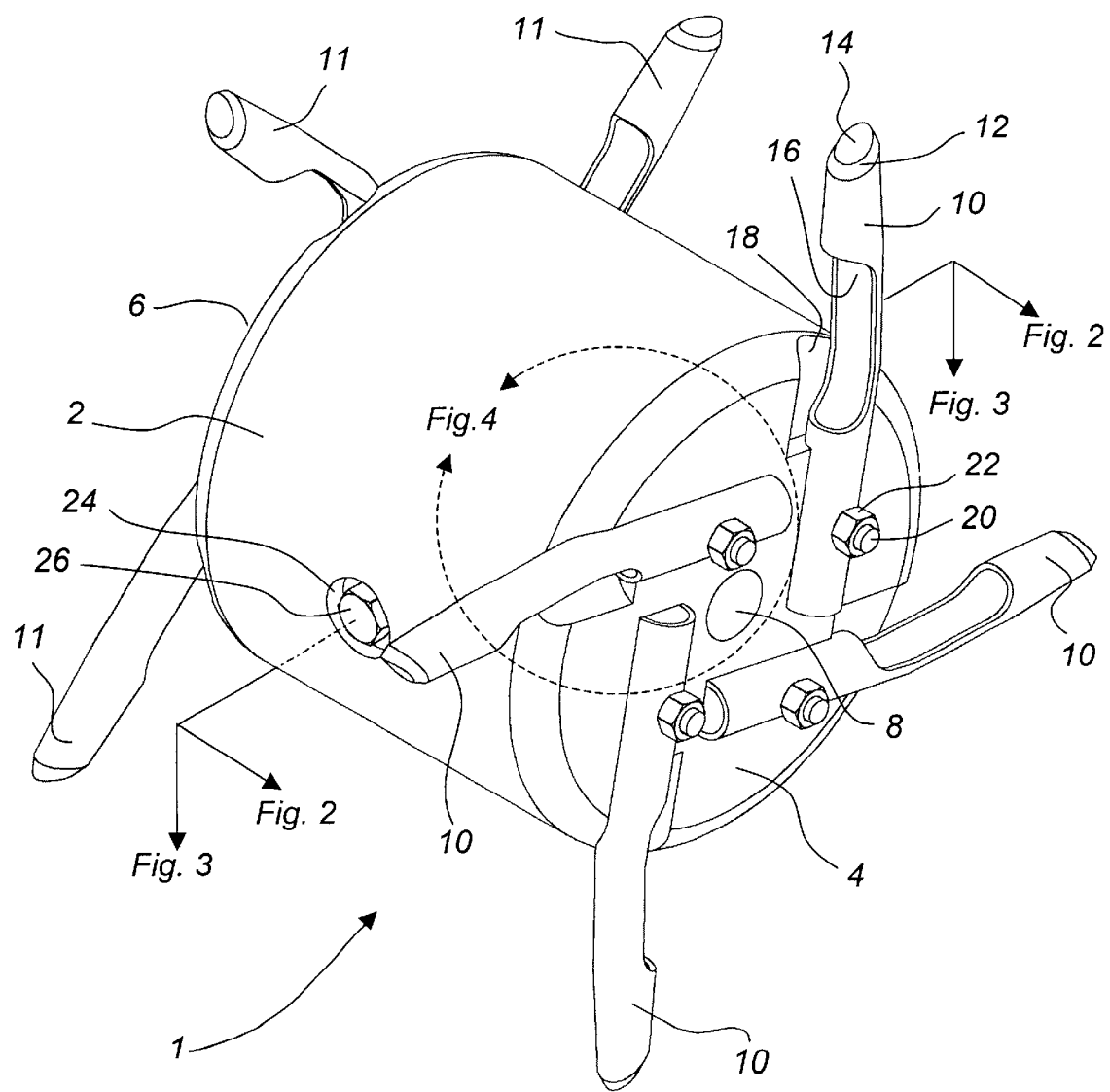
FIG. 1 is an isometric view of a preferred embodiment of the instant inventive turf aerator.
Figure 2:
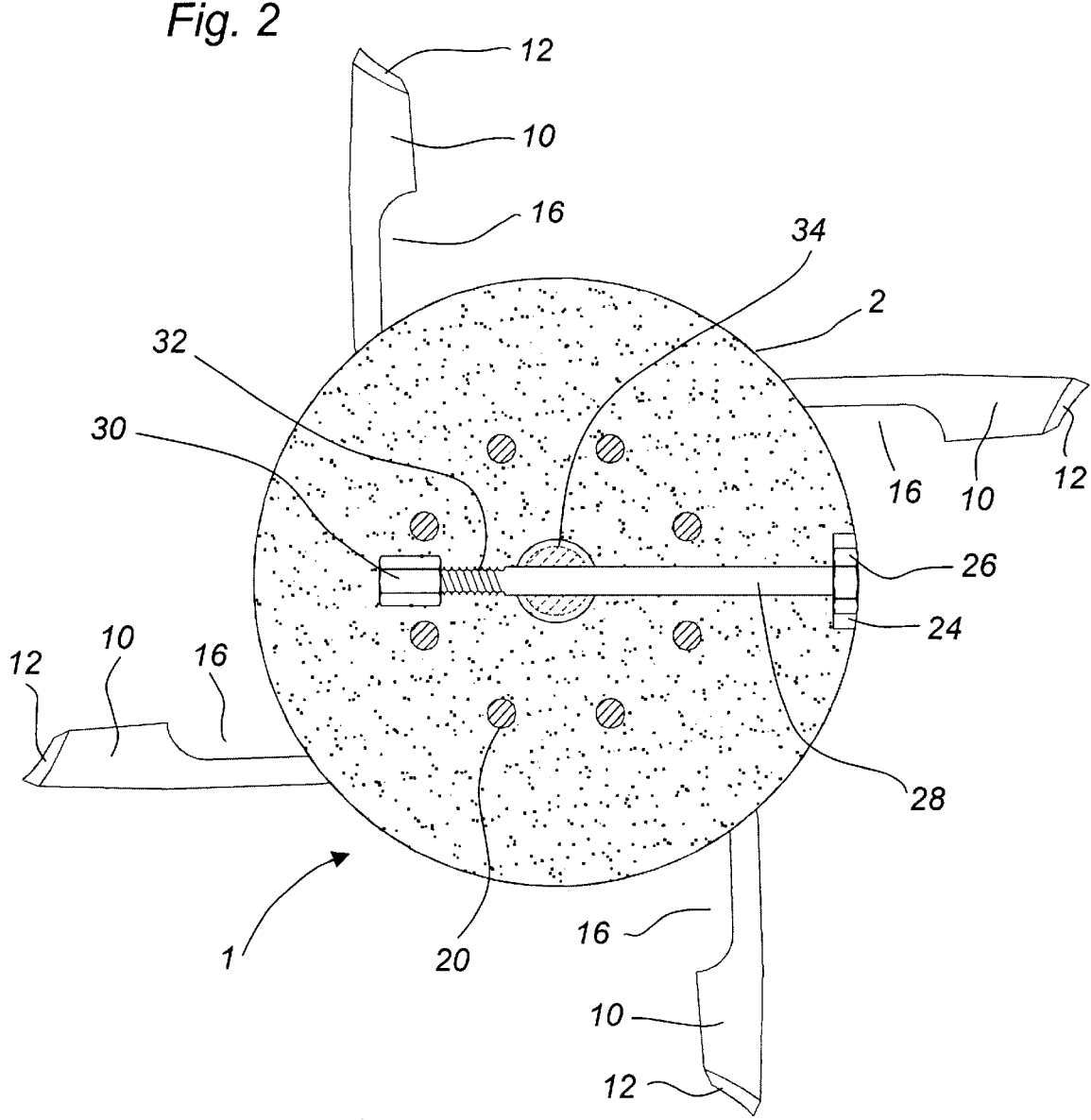
FIG. 2 is a first sectional view as indicated in FIG. 1.
Figure 3:
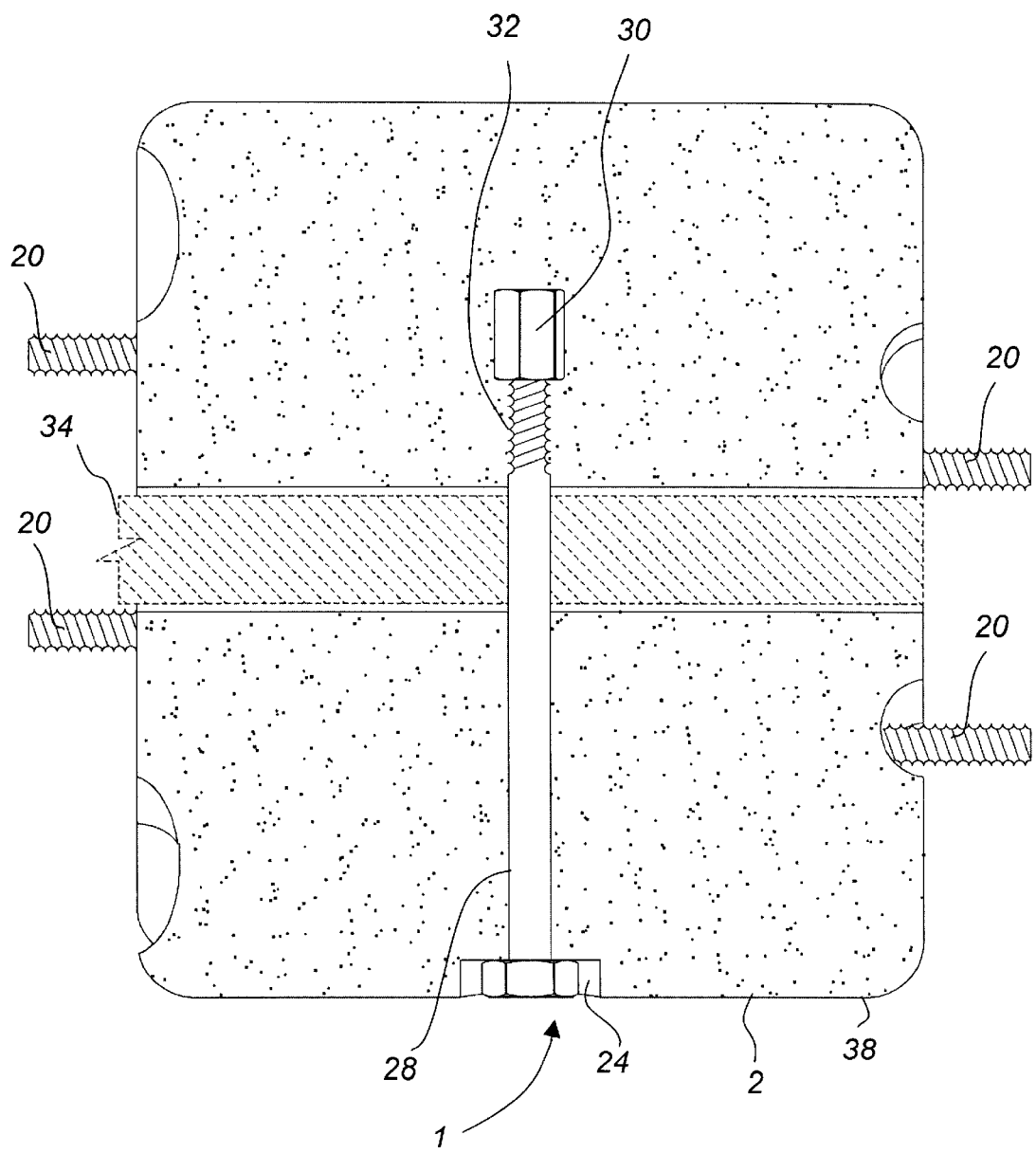
FIG. 3 is a second sectional view as indicated in FIG. 1, the view showing tines removed.

Referring now to the drawings, and in particular to FIG. 1, the instant inventive turf aerator is referred to generally by reference arrow 1. At least a first roller 2 is preferably fabricated as a substantially solid concrete cylindrical body. Referring simultaneously to FIGS. 1 and 2, roller 2 preferably has an axially extending axle receiving channel 8, said channel receiving an axle 34 shown in ghost. Referring simultaneously to FIGS. 1–3, the roller 2 preferably has a transversely extending pin or bolt receiving channel 24, such channel preferably perpendicularly intersecting the axle receiving channel 8. A transversely extending bolt or pin 28 acts as a shear pin, extending through axle 34 via a shear pin aperture, locking roller 2 in place upon axle 34. A hexagonal or square nut 30 is preferably embedded within the concrete core of the roller 2 at the inner end of channel 24 for threaded receipt of the threaded end 32 bolt or pin 28. Bolt or pin 28 preferably has an enlarged exposed head 26 preventing overinsertion, and facilitating extraction and disassembly.

Figure 4:
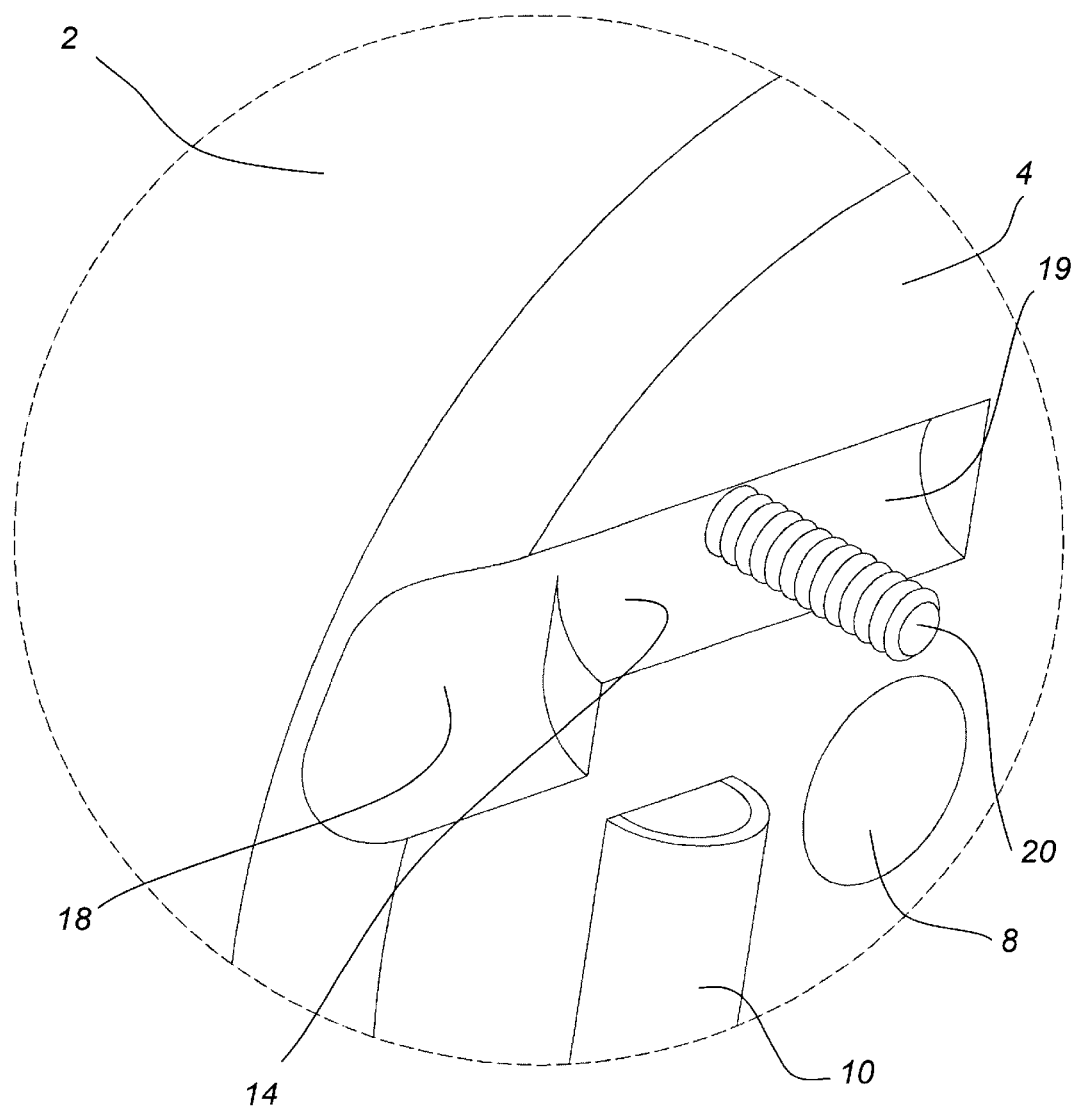
FIG. 4 is a partial magnified view as indicated in FIG. 1, the view showing tine removed.

Referring simultaneously to FIGS. 1 and 4, the roller 2 has laterally opposed end walls 4 and 6. Preferably, end walls 4 and 6 are molded to include semi-circular tine receiving channels 19, the outer end of each tine receiving channel 19 preferably having a widened dirt and thatch outlet section 18. Preferably, spirally threaded bolts 20 are embedded within the roller 2, each bolt 20 being positioned and oriented so that its spirally threaded end extends laterally outward from a floor of a semi-circular tine receiving channel 19. Preferably, the embedded ends of bolts 20 extend inwardly substantially the full lateral length of the roller 2, allowing the heads and shafts of such bolts 20 to dually serve as concrete reinforcement bars and as mounting lug anchors.

Referring further simultaneously to FIGS. 1 and 4, at least a first tubular tine, and preferably paired radial arrays of tubular tines 10 and 11, are preferably nestingly mounted within the tine receiving channels 19, the radial tine arrays 10 and 11 being held in place by the spirally threaded ends or lugs of bolts 20. Lugs 20 preferably extend through lug receiving apertures within the side walls of tines 10 and 11. Spirally threaded nuts 22 are preferably threadedly mounted over the threaded ends of bolts 20, securing the tines 10 and 11 in place within their tine receiving channels 19. Nuts 22 preferably include internal plastic lock sleeves, preventing loosening during use of the turf aerator 1. Side walls of channels 19 advantageously dually serve as rotation stops preventing the tines 10 and 11 from undesirably rotating with respect to mounting lugs 20, and as means for lessening undesirable applications of twisting forces to mounting lugs 20. Suitably, though less desirably, end walls of the roller of the inventive aerator may exclude tine receiving channels. Where tines are not received within tine receiving channels, stop pins or stop flanges (not depicted) may alternately be utilized as rotation stopping means. The numerous alternate means utilizable for attaching the tines 10 and 11 to the side walls 4 and 6 of the roller 2 are generally utilizable as rotation stopping means.

Referring to FIG. 1, while radial arrays of tines 10 and 11 preferably each include four tines, the arrays may each suitably include as few as three tines. Preferably, as indicated in FIG. 1, the radial arrays of tines 10 and 11 are radially offset so that tines are not simultaneously downwardly driven, reducing the down force needed for operating turf aerator 1.

Referring simultaneously to FIGS. 1–3, each tine among the radial arrays of tines 10 and 11 preferably has a hollow bore 14 forming an outwardly opening soil and thatch inlet port, a beveled or chamfered soil and thatch cutting end 12, and a soil and thatch outlet port 16.

Figure 5:
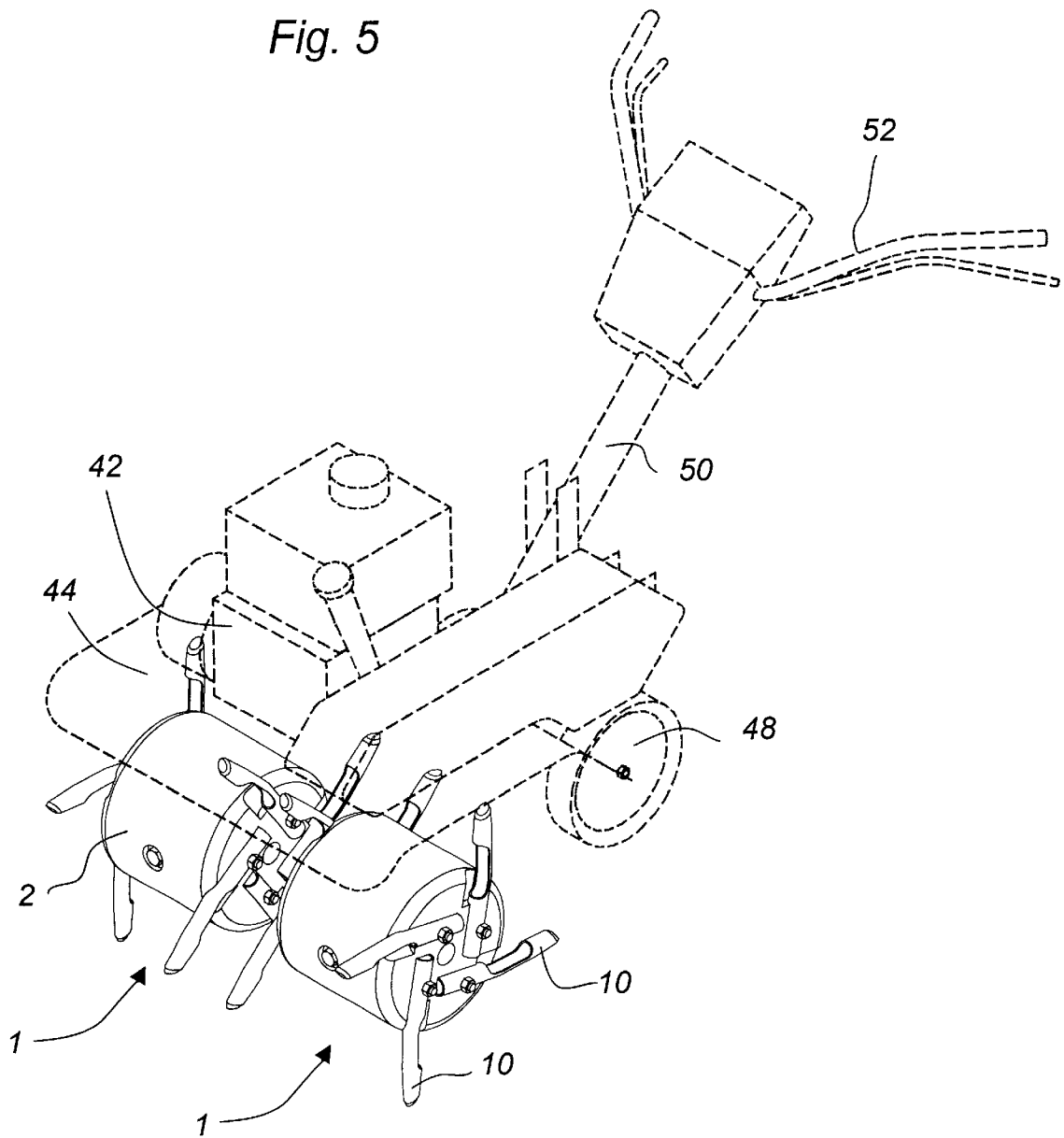
FIG. 5 shows a pair of the instant inventive turf aerator's installed for use in a preferred fashion upon a common walk-behind rototiller.

Referring to FIG. 5, a preferred pair of the inventive turf aerators 1 are shown in a preferred mounting configuration upon a common walk-behind rototiller (shown in ghost), the rototiller having its rotary tilling implements removed. Such rototiller typically has a four cycle gasoline engine 42 mounted over a tine shield 44, such shield supporting downwardly and rearwardly extending wheels 48 and supporting a central drive linkage (not depicted) extending downwardly therefrom. Referring simultaneously to FIGS. 2 and 5, axles 34 extend laterally in opposite directions for rotatably supporting and driving turf aerators 1.

Referring again to FIG. 5, directional control of the rototiller is provided via shaft 50 and handle bars 52. In use of the inventive turf aerator 1, referring to FIGS. 1 and 5, the depicted rototiller is started and an operator, standing behind the rototiller and grasping handle bars 52, engages the mechanism's drive clutch, causing arrays of turf aerators 1 to rotate counter-clockwise, causing tubular tines 10 and 11 to successively drive into the turf, aerating the turf. Soil and thatch passes through the hollow bores 14 of the tubular tines 10 and 11 for emission from outlet ports 16, clear of the annular rolling surface of the rollers 2. The concrete rollers 2 provide weight or ballast for downwardly driving the tines 10 and 11, while serving as means for controlling the depth of insertion of the tines. The rollers 2 further dually function to hold turf in place during extractions of tines 10 and 11, reducing tearing and gouging of turf surfaces while tines 10 and 11 are withdrawn.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. A turf aerator comprising:
   (a) at least a first roller having an axis of rotation, having an annular surface displaced radially away from the axis of rotation, and having a first lateral end;
   (b) at least a first tubular tine having inner and outer ends, and having soil input and output ports; and,
   (c) attaching means adapted for interconnecting the at least first tubular tine and the at least first roller, the attaching means positioning the at least first tubular tine at the first lateral end of the at least first roller, the attaching means further positioning the at least first tubular tine so that its inner and outer ends are radially displaced from the at least first roller's axis of rotation, the radial displacements of said ends being respectively less than and greater than that of the annular surface, the at least first roller having a second lateral end, and further comprising at least a second tubular tine having inner and outer ends, and having soil input and output ports; the attaching means being further adapted for interconnecting the at least second tubular tine and the at least first roller, the attaching means further positioning the at least second tubular tine at the second lateral end of the at least first roller, the attaching means further positioning the at least second tubular tine so that its inner and outer ends are radially displaced from the at least first roller's axis of rotation, the radially displacements of said ends being respectively less than and greater than that of the annular surface, the outer ends of the at least first and second tubular tines being annularly beveled, each of the at least first and second tubular tines having a side wall, the soil output port of each such tine extending through its side wall, and further comprising at least a third, a fourth, a fifth, and a sixth tubular line, each such tine having inner and outer ends, and having soil input and output ports; the attaching means being further adapted for interconnecting the at least third, fourth, fifth, and sixth tubular tines, and the at least first roller, the attaching means further respectively positioning the at least third and fifth and the at least fourth and sixth tubular tines at the first and second lateral ends of the at least first roller, the attaching means further positioning the at least third, fourth, fifth, and sixth tubular tines so that their inner and outer ends are radially displaced from the at least first roller's axis of rotation, the radially displacements of said ends being respectively less than and greater than that of the annular surface; the attaching means further respectively positioning the at least first, third, and fifth, and the at least second, fourth, and sixth tubular tines in first and second radial arrays; the first and second lateral ends of the at least first roller comprising end walls, the attaching means comprising a plurality of tine receiving channels within said walls, each tine receiving channel having a floor, the attaching means further positioning the at least first, second, third, fourth, fifth, and sixth tubular tines nestingly within said channels.

2. The turf aerator of claim 1 wherein each of the at least third, fourth, fifth, and sixth tubular tines has a side wall, wherein each of the at least first, second, third, fourth, fifth, and sixth tubular tines has a mounting lug receiving aperture extending through its side wall, and wherein the attaching means further comprises mounting lugs extending outwardly from the floors of the tine receiving channels.

3. The turf aerator of claim 2 wherein the roller comprises cast concrete, and further comprising an axle receiving channel extending axially therethrough.

4. The turf aerator of claim 3 further comprising a pin receiving channel intersecting the axle receiving channel.

5. A turf aerator comprising:

(a) at least a first roller having an axis of rotation, having an axial length, having a circular around contact surface displaced radially away from the axis of rotation, and having a first lateral end;

(b) at least a first tubular tine having inner and outer ends, and having soil input and output ports;

(c) attaching means adapted for interconnecting the at least first tubular tine and the at least first roller, the attaching means positioning the at least first tubular tine at the first lateral end of the at least first roller, the attaching means further positioning the at least first tubular tine so that its inner and outer ends are radially displaced from the at least first roller's axis of rotation, the radial displacements of said ends being respectively less than and greater than that of the circular around contact surface, the axial length of the roller being at least as great as the radial displacement of the outer end of the at least first tubular time away from the circular ground contact surface; and (d) at least a second roller, the at least second roller being tined and having an axis of rotation, and further comprising means for positioning the at least second roller in axial alignment with the at least first roller, said means so positioning the at least second roller, the axial positioning means comprising a machine selected from the group of rototillers, boom arm auxiliary implements, lift arm auxiliary implements, and trailering auxiliary implements.

\* \* \* \* \*

UNITED STATES PATENT AND TRADEMARK OFFICE
CERTIFICATE OF CORRECTION

PATENT NO. : 6,684,960 B1
DATED : February 3, 2004
INVENTOR(S) : Cheong-Yeow Ng et al.

It is certified that error appears in the above-identified patent and that said Letters Patent is hereby corrected as shown below:

Column 7,
Line 20, delete "around" and substitute -- ground --.

Signed and Sealed this

Seventh Day of March, 2006

JON W. DUDAS
*Director of the United States Patent and Trademark Office*